(12) United States Patent
Yada et al.

(10) Patent No.: US 12,567,717 B2
(45) Date of Patent: Mar. 3, 2026

(54) SYSTEM AND METHOD FOR AMPLIFICATION OF GREEN LASER PULSES

(71) Applicant: IMRA America, Inc., Ann Arbor, MI (US)

(72) Inventors: Hiroyuki Yada, Ann Arbor, MI (US); Yuki Ichikawa, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 1129 days.

(21) Appl. No.: 17/537,885

(22) Filed: Nov. 30, 2021

(65) Prior Publication Data

US 2022/0239053 A1     Jul. 28, 2022

Related U.S. Application Data

(60) Provisional application No. 63/142,784, filed on Jan. 28, 2021.

(51) Int. Cl.
| | |
|---|---|
| *H01S 3/0941* | (2006.01) |
| *H01S 3/094* | (2006.01) |
| *H01S 3/16* | (2006.01) |
| *H01S 3/23* | (2006.01) |
| *H01S 3/10* | (2006.01) |

(52) U.S. Cl.
CPC .... *H01S 3/09415* (2013.01); *H01S 3/094076* (2013.01); *H01S 3/1613* (2013.01); *H01S 3/235* (2013.01); *H01S 3/094049* (2013.01); *H01S 3/10061* (2013.01); *H01S 3/1653* (2013.01)

(58) Field of Classification Search
CPC ..................................................... H01S 3/1613
See application file for complete search history.

(56) References Cited

U.S. PATENT DOCUMENTS

| | | | | |
|---|---|---|---|---|
| 4,167,712 A | * | 9/1979 | Esterowitz | H01S 3/16 |
| | | | | 372/54 |
| 6,490,309 B1 | * | 12/2002 | Okazaki | B82Y 20/00 |
| | | | | 372/75 |
| 9,570,880 B2 | | 2/2017 | Fermann et al. | |
| 2005/0105865 A1 | | 5/2005 | Fermann et al. | |
| 2018/0233878 A1 | * | 8/2018 | Leonardo | H01S 3/302 |
| 2019/0109431 A1 | * | 4/2019 | Waterbury | G01J 3/0208 |

OTHER PUBLICATIONS

Novak et al., "Thin disk amplifier-based 40 mJ, 1 kHz, picosecond laser at 515 nm," Opt. Express 24, 5728-5733 (2016). (Year: 2016).*

Okamoto et al., "Visible-NIR tunable Pr-doped fiber laser pumped by a GaN laser diode," Opt. Express 17(22):20227-32 (2009). (Year: 2009).*

(Continued)

*Primary Examiner* — Yuqing Xiao
*Assistant Examiner* — Zhengqing Qi
(74) *Attorney, Agent, or Firm* — Knobbe, Martens, Olson & Bear, LLP

(57)     ABSTRACT

A laser amplifier for a green laser pulse includes at least one gain medium doped with praseodymium and at least one gallium nitride based diode laser for pumping the gain medium. A green seed laser pulse going through the gain medium becomes an amplified green laser pulse.

18 Claims, 17 Drawing Sheets

(56) References Cited

OTHER PUBLICATIONS

Backus et al., "0.2-TW laser system at 1 kHz." Optics Letters, vol. 22, No. 16, dated Aug. 15, 1997, pp. 1256-1258.

Cornacchia et al., "Efficient visible laser emission of GaN laser diode pumped Pr-doped fluoride scheelite crystals." Optics Express, vol. 16, No. 20, dated Sep. 29, 2008, pp. 15932-15941.

Gün et al., "Power scaling of laser diode pumped $Pr^3+:LiYF_4$ cw lasers: efficient laser operation at 522.6 nm, 545.9 nm, 607.2 nm, and 639.5 nm." Optics Letters, vol. 36, No. 6, dated Mar. 15, 2011, pp. 1002-1004.

Hara et al., "640-nm Pr:YLF regenerative amplifier seeded by gain-switched laser diode pulses." Applied Optics, vol. 59, No. 17, dated Jun. 10, 2020, pp. 5098-5101.

Hönninger et al., "Efficient and tunable diode-pumped femtosecond Yb:glass lasers." Optics Letters, vol. 23, No. 2, dated Jan. 15, 1998, pp. 126-128.

Liu et al., "Chirped-pulse amplification of ultraviolet femtosecond pulses by use of $Ce^3+:LiCaAlF_6$ as a broadband, solid-state gain medium." Optics Letters, vol. 26, No. 5, dated Mar. 1, 2001, pp. 301-303.

Luo et al., "Power scaling of blue-diode-pumped Pr:YLF lasers at 523.0, 604.1, 606.9, 639.4, 697.8 and 720.9 nm." Optics Communications, vol. 380, dated Dec. 2016, pp. 357-360.

Nakanishi et al., "High-power direct green laser oscillation of 598 mW in $Pr^3+$-doped waterproof fluoroaluminate glass fiber excited by two-polarization-combined GaN laser diodes." Optics Letters, vol. 36, No. 10, dated May 15, 2011, pp. 1836-1838.

Okamoto et al., "Efficient 521 nm all-fiber laser: splicing $Pr^3+$-doped ZBLAN fiber to end-coated silica fiber." Optics Letters, vol. 36, No. 8, dated Apr. 15, 2011, pp. 1470-1472.

Reichert et al., "Diode pumped laser operation and spectroscopy of $Pr^3+:LaF_3$." Optics Express, vol. 20, No. 18, dated Aug. 27, 2012, pp. 20387-20395.

Richter et al., "Power scaling of semiconductor laser pumped Praseodymium-lasers.", Optics Express, vol. 15, No. 8, dated Apr. 16, 2007, pp. 5172-5178.

Shah et al., "High-Power Ultrashort-Pulse Fiber Amplifiers." IEEE Journal of Selected Topics in Quantum Electronics, vol. 22, No. 3, dated 2007 in 8 pages.

Sugiyama et al., "Diode-pumped 640 nm Pr:YLF regenerative laser pulse amplifier.", Optics Letters, vol. 44, No. 13, dated Jul. 1, 2019, pp. 3370-3373.

* cited by examiner

FIG. 4A:
FIG. 4B:
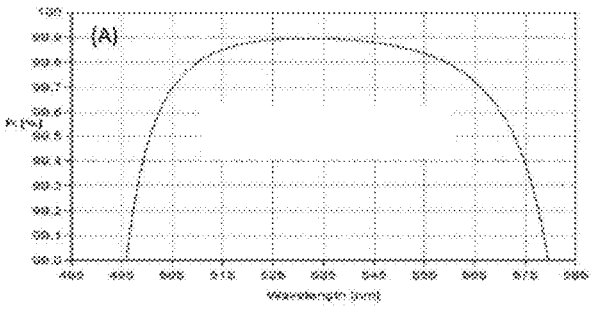
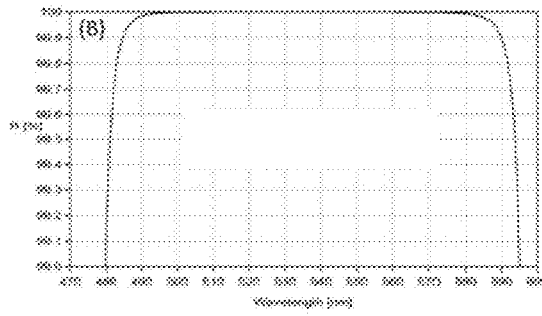

FIG. 9:

FIG. 10A:
FIG. 10B:
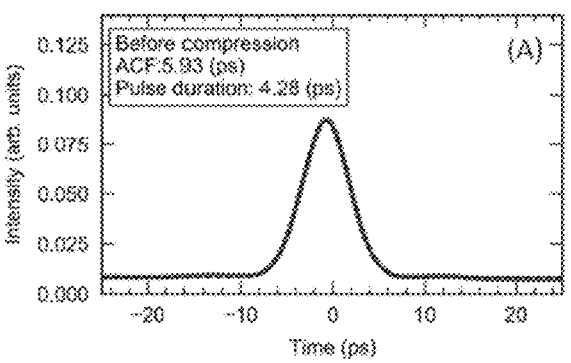
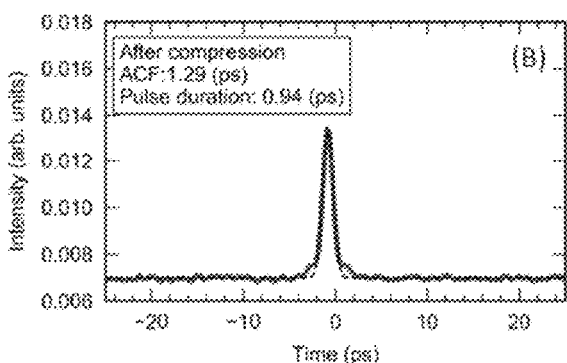

SYSTEM AND METHOD FOR AMPLIFICATION OF GREEN LASER PULSES

CLAIM OF PRIORITY

This application claims the benefit of priority to U.S. Provisional Appl. No. 63/142,784 filed Jan. 28, 2021 which is incorporated herein in its entirety.

BACKGROUND

Field

This application relates generally to laser amplification systems and more particularly to systems and methods for amplification of green laser pulses.

Description of the Related Art

An ultrafast pulse laser with a high pulse energy and duration less than 30 ps is highly demanded in machining industry as a laser source for precision machining for its unique feature of light-matter interaction yielding a minimum heat affected zone around the material removal spot. For example, for two main reasons, precision machining of wide-bandgap semiconductors such as, so called, next-generation power semiconductors including silicon carbide (bandgap equal to about 3.2 eV), gallium nitride (GaN) semiconductor (bandgap equal to about 3.4 eV) and gallium oxide (bandgap equal to about 4.8 eV), ultrafast lasers in the green region (e.g., wavelengths in a range of 495 nm to 570 nm; photon energies in a range of 2.17 eV to 2.51 eV) is promising. First, internal material processing such as three-dimensional machining for next generation semiconductor is available since the photon energy of the green pulses (e.g., 2.17-2.51 eV) is lower than the bandgaps of most next-generation power semiconductors (e.g., greater than 3.1 eV), which allows the laser pulses to penetrate into the material. With the laser beam focused in the material, multi-photon absorption occurs around the focal volume, caused by the intense laser field in the ultrashort time duration which enables internal material processing with a high precision. Secondly, an efficient surface processing of a wide-bandgap material is available when the photon energy is doubled. The photon energy of the frequency-doubled pulse (e.g., wavelengths in a range of 247.5 nm to 285 nm; photon energies in a range of 4.34 eV to 5.02 eV) falls in or near the ultraviolet C (UVC) region (e.g., wavelengths less than 280 nm; photon energies greater than 4.4 eV) and can overcome a bandgap of these material for a direct excitation. In addition, the short wavelength in UVC can be focused about 4 times as tight as that of 1 μm-wavelength laser source, which is also beneficial for a precision surface machining. At least, for the above reasons, ultrafast lasers in the green region (e.g., wavelengths in a range of 495 nm to 570 nm) with an ultrashort duration less than 30 ps are highly valuable for precision machining of wide bandgap semiconductors.

In many applications, an ultrafast laser pulse in the green wavelength region is produced by a second harmonic generation (SHG) from an ultrafast pulse source with the fundamental wavelength around 1 μm, such as ytterbium (Yb) doped silica fiber-based ultrafast pulse lasers and Yb-based solid state lasers having center wavelengths in a range from about 1030 nm to 1082 nm (see, e.g., C. Hönninger et al., "Efficient and tunable diode-pumped femtosecond Yb: glass lasers," Opt. Lett., Vol. 23, pp. 126-128 (1998)). However, for generating high energy ultrashort pulses in green via a nonlinear process, even higher pulse energies are used for the fundamental wavelength which increase the design complexity and heighten the engineering efforts for the near infrared laser, resulting in a high initial cost for users who want to introduce such laser systems in their applications. In addition, as an SHG crystal is exposed to intense 1-μm ultrafast pulses while generating the green pulses, the optical quality of the SHG crystal becomes degraded over time and replacement with a new SHG crystal can cause additional maintenance cost of the laser system.

A direct amplification has previously been demonstrated in near-infrared optical pulses (e.g., wavelengths equal to about 800 nm) (see, e.g., S. Backus et al., "0.2-TW laser system at 1 kHz," Opt. Lett., Vol. 22, pp. 1256-1258 (1997)) and in the UV region (e.g., wavelength equal to about 290 nm) (see, e.g., Z. Liu et al., "Chirped-pulse amplification of ultraviolet femtosecond pulses by use of $Ce^{3+}$:$LiCaAlF_6$ as a broadband, solid-state gain medium," Opt. Lett., Vol. 26, pp. 301-303 (2001)). An example of direct amplification in near infrared optical pulse employs a titanium-doped sapphire crystal as a gain material. A seed ultrashort pulse can be either from a titanium sapphire mode-locked laser or from second harmonic generation from an erbium (Er) doped fiber-based pulse laser. The seed pulse can be amplified, for example, with a regenerative amplification method. However, to generate ultrafast pulse in the UVC region from photons having a wavelength equal to about 800 nm, at least, a third harmonic generation (THG) is used. On the other hand, direct amplification in the UV region (e.g., 290 nm) has been demonstrated (see, e.g., Liu 2001) by employing an ultraviolet seed pulse (e.g., 290 nm) generated by THG from the titanium doped sapphire regenerative amplifier. An ultra-violet pulse was amplified by a chirped pulse regenerative amplifier technique with a cerium (Ce)-doped gain material ($Ce^{3+}$:$LiCaAlF_6$ crystal), pumped by a 266 nm laser generated by fourth harmonic generation of a neodymium-doped yttrium aluminum garnet nanosecond laser. However, the wavelength of frequency-doubling from the green pulse is still shorter than 290 nm. Also, for internal micro-machining of wide-bandgap semiconductors, using multiple photon absorption of green pulse is still used.

More recently, direct amplification of visible optical pulses (e.g., 640 nm) has been proved (see, e.g., N. Sugiyama et al., "Diode-pumped 640 nm Pr:YLF regenerative laser pulse amplifier," Opt. Lett., Vol. 44, pp. 3370-3373 (2019); Y. Hara et al., "640-nm Pr:YLF regenerative amplifier seeded by gain-switched laser diode pulses," Appl. Opt., Vol. 59, pp. 5098-5101 (2020)) which utilized trivalent-praseodymium-doped yttrium lithium fluoride ($Pr^{3+}$:$LiYF_4$) crystal as a gain material. The gain material was pumped by a GaN-based laser diode having a wavelength equal to about 450 nm and a regenerative amplifier system where a seed pulse goes through the gain material for multiple round trips was used. In Sugiyama 2019, the seed pulse was obtained from a mode-locked $Pr^{3+}$:$LiYF_4$ laser and they obtained an amplified pulse with energy of 13 μJ and pulse duration of 45 ps. In Hara 2020, the seed pulse had a wavelength equal to about 640 nm, a pulse duration of 65 ps from a gain switched laser diode was used, and they confirmed an amplified pulse with the energy of 33 μJ with a pulse duration of 400 ps. In Hara 2020 the elongation of pulse duration was attributed to the spectral narrowing of the pulse during amplification. Indeed, they observed that the spectra of amplified pulse was equivalent to that of a continuous wave laser of $Pr^{3+}$:$LiYF_4$, although the original seed pulse has wider bandwidth than a continuous wave laser. Thus, a pulse duration of less than 30 ps has not been demonstrated. In addition, the SHG of 640 nm pulse does not reach the UVC region (e.g., wavelength less than 280 nm).

SUMMARY

In certain implementations, a laser amplifier for a green laser pulse is provided. The laser amplifier comprises at least one gain medium doped with praseodymium and at least one gallium nitride based diode laser for pumping the gain medium, whereby a green seed laser pulse going through the gain medium becomes an amplified green laser pulse.

In certain implementations, a method of laser pulse amplification is provided. The method comprises providing a green laser pulse, providing at least one gain material doped with praseodymium, and pumping the gain material by at least one gallium nitride based diode laser. The method further comprises having the green laser pulse go through the gain material, such that the green laser pulse becomes an amplified green laser pulse.

BRIEF DESCRIPTION OF THE DRAWINGS

FIG. 4A shows an example reflectivity spectrum of an end mirror in accordance with certain implementations described herein.

FIG. 4B shows an example reflectivity spectrum of a pump mirror in accordance with certain implementations described herein.

FIG. 9 schematically illustrates pulse compression of the amplified green laser pulse in accordance with certain implementations described herein.

FIG. 10A shows the autocorrelation function of the amplified green laser pulse before pulse compression in accordance with certain implementations described herein.

FIG. 10B shows the autocorrelation function of the amplified green laser pulse after pulse compression in accordance with certain implementations described herein.

DETAILED DESCRIPTION

Figure 1:
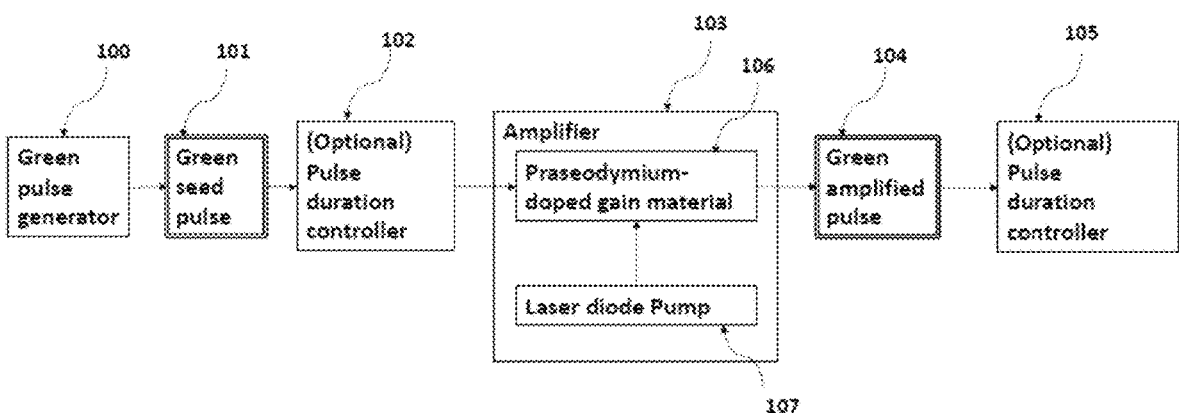
FIG. 1 schematically illustrates an example laser amplifier for green laser pulses in accordance with certain implementations described herein.

Overview $Pr^{3+}$-doped gain material and blue laser from GaN-based semiconductors can be an efficient ultrashort green pulse amplifier. Indeed, $Pr^{3+}$-doped gain material pumped with blue GaN-based laser diodes generates a continuous wave (CW) laser in green region from 522 nm to 523 nm from praseodymium-doped yttrium lithium fluoride ($Pr^{3+}$:$LiYF_4$) (see, e.g., A. Richter et al., "Power scaling of semiconductor laser pumped Praseodymium-lasers," Opt. Express, Vol. 15, No. 8, pp. 5172-5178 (2007); T. Gün et al., "Power scaling of laser diode pumped $Pr^{3+}$:$LiYF_4$ cw lasers: efficient laser operation at 522.6 nm, 545.9 nm, 607.2 nm, and 639.5 nm," Opt. Lett., Vol. 36, pp. 1002-1004 (2011); S. Luo et al., "Power scaling of blue-diode-pumped Pr:YLF lasers at 523.0, 604.1, 606.9, 639.4, 697.8 and 720.9 nm," Opt. Comm., Vol. 380, pp. 357-360 (2016); F. Cornacchia et al., "Efficient visible laser emission of GaN laser diode pumped Pr-doped fluoride scheelite crystals," Opt. Express, Vol. 16, pp 15932-15941 (2008)), about 522 nm from praseodymium-doped gadolinium lithium fluoride ($Pr^{3+}$:$LiGdF_4$) crystal (see, e.g., Cornacchia 2008), 523 nm from praseodymium-doped lutetium lithium fluoride ($Pr^{3+}$:$LiLuF_4$) crystal (see, e.g., Richter 2007), 537.1 nm from praseodymium-doped lanthanum trifluoride ($Pr^{3+}$:$LaF_3$) crystal (see, e.g., E. Reichert et al., "Diode pumped laser operation and spectroscopy of $Pr^{3+}$:$LaF_3$," Opt. Express, Vol. 20, pp. 20387-20395 (2012)), 521 nm from praseodymium-doped ZBLAN fiber (see, e.g., H. Okamoto et al., "Efficient 521 nm all-fiber laser: splicing $Pr^{3+}$-doped ZBLAN fiber to end-coated silica fiber," Opt. Lett., Vol. 36, pp 1470-1472 (2011)), 522.2 nm from praseodymium-doped fluoroaluminate glass fiber (see, e.g., J. Nakanishi et al., "High-power direct green laser oscillation of 598 mW in $Pr^{3+}$-doped waterproof fluoroaluminate glass fiber excited by two-polarization-combined GaN laser diodes," Opt. Lett., Vol. 36, pp 1836-1838 (2011)). U.S. Pat. No. 6,490,309 proposed Pr-doped gain material pumped by a blue light from GaN-based semiconductor laser diode for a continuous wave laser oscillation from 700 nm to 800 nm, and U.S. Pat. No. 7,197,059 proposed praseodymium-doped gain material pumped by blue light from GaN-based semiconductor based laser diode for 370 nm to 800 nm continuous wave laser oscillation. However, these previous works are directed at continuous wave laser generation and do not demonstrate an amplifier for ultrashort green pulses with the use of Pr-doped gain material pumped by a GaN-based semiconductor laser.

Thus, previously disclosed methods for obtaining high-energy and ultrashort green laser pulse relying on SHG utilize a costly high power 1-µm ultrashort pulsed laser source. Also, direct amplification of visible pulses is limited to the red region (e.g., 640 nm) and is unavailable in the green region (e.g., 495 nm to 570 nm). In addition, the pulse durations of the red pulses previously disclosed by Sugiyama 2019 and Hara 2020 were elongated to more than 45 ps. In other words, cost-effective methods to provide ultrafast green laser pulses with high energy (e.g., in the range of 495 nm to 570 nm) and short duration (e.g., less than 30 ps) have not yet been demonstrated and direct amplification of green laser pulses to produce ultrafast green laser pulses with high energy remains highly demanded in the micro-machining industry.

In certain implementations described herein, a laser amplifier for a green laser pulse comprises at least one gain medium doped with praseodymium (Pr) and at least one gallium nitride (GaN)-based diode laser for pumping said gain medium doped with praseodymium (Pr). In the laser amplifier, the gain medium is pumped by the diode laser whose peak wavelength is in the range between 435 nm and 450 nm. By having a green laser pulse as a seed with the peak wavelength in the range between 520 nm and 540 nm, and the spectral bandwidth of more than 0.6 nm in full width at half maximum go through the gain medium, the seed pulse is amplified. The pulse energy of the amplified pulse is more than 10 times larger than that of initial seed pulse. The peak wavelength and the spectral bandwidth in full width at half maximum are in the range between 520 nm and 540 nm, and more than 0.4 nm, respectively. The pulse duration of said amplified pulse is in the range between 0.6 ps and 30 ps.

EXAMPLE IMPLEMENTATIONS

FIG. 1 is a flowchart diagram of an example laser amplifier for green laser pulses in accordance with certain implementations described herein. A green seed pulse 101 is provided by a green pulse generator 100. By having the seed pulse 101 go through the amplifier 103, direct amplification of green pulses takes place and green amplified pulses 104 are obtained.

Figure 2:
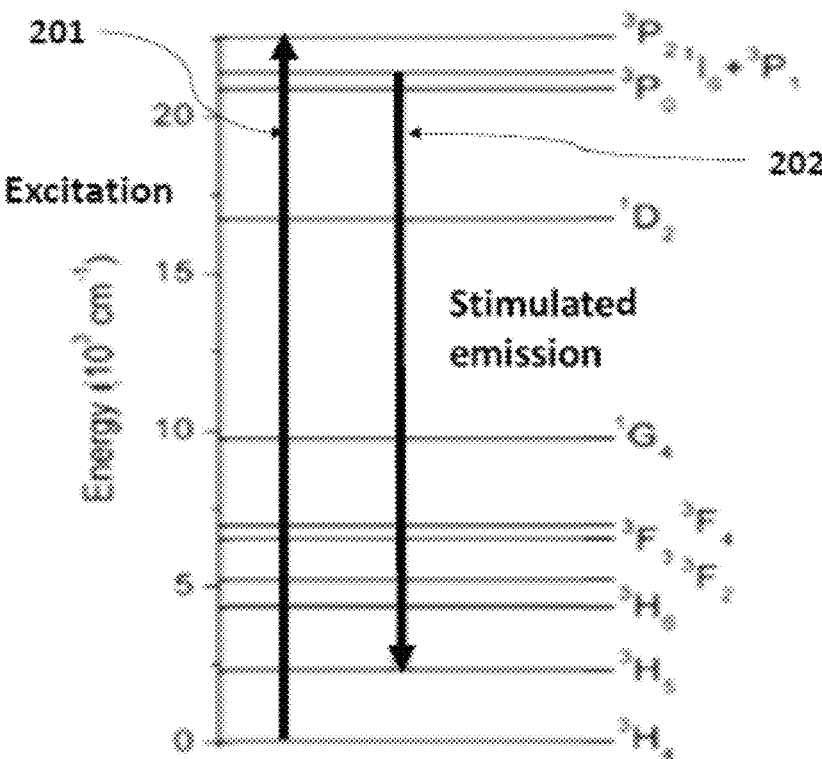
FIG. 2 schematically illustrates an energy level diagram for trivalent praseodymium ($Pr^{3+}$) with excitation and emission energies.

For direct amplification of a green laser pulse, a trivalent praseodymium ($Pr^{3+}$)-doped gain material can be employed using the energy levels for a laser system. FIG. 2 schematically illustrates an example energy level diagram for $Pr^{3+}$. $Pr^{3+}$ can be excited from $^3H_4$ level to $^3P_J$ (j=2, 1, 0) level by blue light. For a $Pr^{3+}$-doped yttrium lithium fluoride ($Pr^{3+}$: $LiYF_4$) crystal in the polarization parallel to the crystal axis (n), the wavelengths can be adjusted to the absorption band whose peaks are located at about 444 nm, 469 nm, and 479 nm (see, e.g., Richter 2007), respectively. Depending on the crystal field and the crystal axes of host material, energy levels of $^3P_2$, $^3P_1$ or $^3P_0$ can slightly differ. For example, as observed in praseodymium-doped lanthanum trifluoride ($Pr^{3+}$:$LaF_3$) crystal, they are at about 442.0 nm ($\sigma$ polarization), 461.6 nm ($\pi$ polarization), and 479.0 nm ($\pi$ polarization) (see, e.g., Reichert 2012). In certain implementations, the photon energy of the laser diode pump 107 is tuned to match up with the energy difference between the $^3H_4$ level and the $^3P_2$, $^3P_1$ or $^3P_0$ level so that an efficient pump absorption occurs to induce a population inversion. For a $Pr^{3+}$:$LiYF_4$ crystal, continuous wave (CW) green lasing is observed in the range from 522 nm to 523 nm (see, e.g., Richter 2007; Gün 2011; Luo 2016; Cornacchia 2008), which can be attributed to the transition from $^3P_1$ to $^3H_5$. As in the case of absorption, the wavelength of the green oscillation is slightly different depending on the crystal field and the crystal axes of host material, as observed in $Pr^{3+}$: $LaF_3$ crystal at 537.1 nm (see, e.g., Reichert 2012). Thus, in certain implementations, the peak wavelength of the green seed pulse is chosen according to the wavelength of the continuous wave oscillation in green, so that stimulated emission occurs efficiently and the energy of the green seed pulse 101 is amplified coherently. In certain implementations, spectral bandwidth of the green seed pulse 101 is broad enough to achieve a pulse duration shorter than 30 ps for the green amplified pulse 104.

In certain implementations, the green pulse generator 100 comprises SHG of an ytterbium (Yb)-doped silica or phosphate glass fiber pulse laser or SHG of a pulse laser comprising a Yb-doped gain crystal such as $Yb^{3+}$:$YVO_4$, $Yb^{3+}$:$KGd(WO_4)_2$, $Yb^{3+}$:$KY(WO_4)_2$, $Yb^{3+}$:$KLu(WO_4)_2$, $Yb^{3+}$:$NaGd(WO_4)_2$, $Yb^{3+}$:$Sr_3Y(BO_3)_3$, $Yb^{3+}$:$GdCa_4O$ $(BO_3)_3$, $Yb^{3+}$:$Sr_5(PO_4)_3F$, $Yb^{3+}$:$SrY_4(SiO_4)_3O$, $Yb^{3+}$: $Y_2SiO_5$, $Yb^{3+}$:$CaAlGdO_4$, $Yb^{3+}$:$CaF_2$ and $Yb^{3+}$:$SrF_2$. In certain implementations, the green pulse generator 100 comprises a third harmonic generation of erbium (Er) doped fiber laser, a mode-locked green pulse laser comprising a Pr-doped gain material, an optical parametric amplifier comprising titanium sapphire crystal, and a gain switched diode laser or other pulse laser sources. In certain implementations, the green pulse generator 100 comprises a supercontinuum pulse laser source having a part of spectrum widen by nonlinear process, including but not limited to a use of nonlinear fiber, has an overlap with the gain band of $Pr^{3+}$.

As described below with regard to certain implementations, using a green pulse with the spectrum bandwidth wider than 0.6 nm in full width at half maximum is beneficial for the amplified pulse to have sufficient bandwidth to be compressible to less than 10 picoseconds, (e.g., less than a few picoseconds; less than 1 picosecond). While $Pr^{3+}$-based ultrafast green pulse laser sources with the bandwidth wider than 0.6 nm are not presently available, certain implementations use ultrafast green pulses generated by frequency-doubling of Yb-based near-infrared (NIR) ultrafast pulses as seed pulses and results in an unexpectedly broad bandwidth of the amplified pulses.

In certain implementations, amplifier 103 comprises at least one praseodymium (Pr) doped gain material 106 and at least one laser diode pump 107.

In certain implementations, the Pr-doped gain material 106 can comprise Pr-doped fluoride single or poly crystal or ceramic such as $Pr^{3+}$:$LiYF_4$, $Pr^{3+}$:$LiLuF_4$, $Pr^{3+}$:$LiGdF_4$, $Pr^{3+}$:$LiCaAlF_4$, $Pr^{3+}$:$LiSrAlF_4$, $Pr^{3+}$:$KY_3F_{10}$, $Pr^{3+}$:$LaF_3$, $Pr^{3+}$:$BaY_2F_8$, $Pr^{3+}$:$CaF_2$, $Pr^{3+}$:$SrF_2$. The gain material 106 can have $Pr^{3+}$ as a single dopant or the gain material 106 can have multiple dopants. The $Pr^{3+}$-doped gain material can include co-doped material such as other trivalent rare-earth ions. A fluoride host can be a mixture or a solid solution that includes at least one of the above listed fluorides. A host material of the gain material 106 can be a crystal or can be a fluoride glass such as ZBLAN glass, $AlF_3$-based glass, $InF_3$-based glass $BeF_2$-based glass, $ThF_4$-based glass, $ScF_3$-based glass, $GaF_3$-based glass, $ZnF_2$-based glass, $CdF_2$-based glass, $PbF_2$-based glass, and a mixture thereof. Example shapes of the gain material 106 include, but are not limited to a rod, a slab and a fiber.

In certain implementations, the host material of the gain material 106 comprises non-fluoride crystal or glass. In certain implementations, the host material of the gain material 106 comprises a fluoride crystal or glass such that a gain band of the excited trivalent praseodymium ($Pr^{3+}$) matches with the photon energy of green seed pulse.

In certain implementations, the laser diode pump 107 comprises a GaN-based laser, such as blue Indium gallium nitride (InGaN) laser diode (LD), including but not limited to chip-type, bar-type, fiber-delivery-type and a combined use thereof. To achieve a higher pump power, multiple LD chips can be arrayed, multiple LD bars can be stacked, or multiple fiber-delivery outputs can be bundled or arrayed.

In certain implementations, the peak wavelength of the laser diode pump 107 is shifted for efficient pump of praseodymium (Pr) doped gain material 106, since the absorption of $Pr^{3+}$ is dependent on the host material of praseodymium (Pr) doped gain material 106. A wavelength of the laser diode pump 107 at its operation current can be in the range between 435 nm and 450 nm (e.g., in the range between 440 nm and 450 nm; in the range between 442 nm and 447 nm).

In certain implementations, before delivering the green seed pulse 101 to the amplifier 106, the pulse duration of the seed pulse 101 is modified by a pulse duration controller 102. Depending on the pulse energy and duration, the green seed pulse 101 can damage the gain material 106 of the amplifier 103 during pulse amplification. To lower a temporal peak intensity of the laser field in the pulse, for example, chirped pulse amplification method can be applied (see, e.g., Backus 1997; Liu 2001) and the pulse duration controller 102 can serve as a pulse stretcher. A pulse stretcher can be an optical fiber, a prism pair, a diffraction grating, a grism pair (e.g., a combination of a prism and a diffractive grating), a fiber Bragg grating, chirped dielectric mirror, a volume Bragg grating.

In certain implementations, after the amplifier 103, the green amplified pulse 104 can have a pulse duration less than 30 ps. In certain other implementations, the pulse duration controller 105 is used to achieve pulse durations optimized for an intended application. For example, the pulse duration controller 105 can be a pulse compressor comprising a diffraction grating pair, a prism pair, a grism pair (a combination of a prism and a diffractive grating), a chirped dielectric mirror, a volume Bragg grating, a fiber Bragg grating, and a hollow-core fiber.

Figure 3:
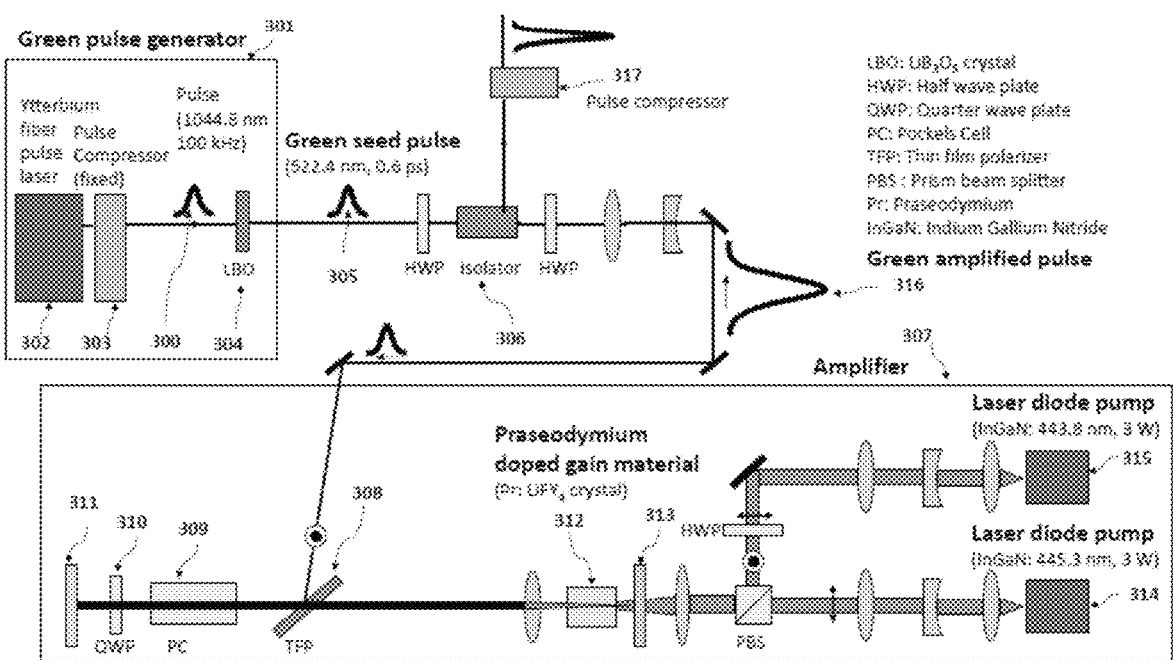
FIG. 3 schematically illustrates an example green laser pulse amplification system in accordance with certain implementations described herein.

FIG. 3 schematically illustrates an example green laser pulse amplification system in accordance with certain implementations described herein. The green laser pulse amplification system comprises a green seed pulse generator 301, a green seed pulse 305, an amplifier 307, an amplified green pulse 316, and a pulse compressor 317. In the example system of FIG. 3, a pulse duration controller 102 for the seed pulse is not used. A green seed pulse 305 is obtained from a green pulse generator 301 comprising an ytterbium (Yb) fiber pulse laser 302, a pulse compressor 303, and a lithium triborate ($LiB_3O_2$) crystal 304. Up-chirped near-infrared pulses (e.g., having a peak wavelength of 1044.8 nm and a repetition rate of 100 kHz) from the ytterbium (Yb) fiber pulse laser 302 are compressed by the pulse compressor 303. The compressed near-infrared pulses 300 are used to generate second harmonic pulses by the lithium triborate ($LiB_3O_2$) crystal 304, generating green seed pulses 305 (e.g., with a peak wavelength of 522.4 nm). In certain implementations, the pulse compressor 303 is fixed so that the pulse duration of the green seed pulse 305 is minimized (e.g., to be 0.63 ps). The green seed pulse 305 is injected to the amplifier 307 comprising a praseodymium (Pr) doped gain material ($Pr^{3+}:LiYF_4$ crystal) 312, which is pumped by two InGaN-based laser diode pumps 314, 315 (e.g., one of the pumps having a wavelength of 445.3 nm and power of 3 W and the other of the pumps having a wavelength of 443.8 nm and power of 3 W). The amplifier further comprises a cavity comprising two mirrors 311, 313 having a high reflectivity in the green region but a low reflectivity in the red region, to suppress several undesirable effects such as a parasite laser oscillation at the red region (e.g., around 640 nm) due to the $Pr^{3+}$-doped gain material having an emission cross section in the red region that is much higher than that of the green region (see, e.g., Richter 2007).

FIG. 4A shows an example reflectivity spectrum of an end mirror in accordance with certain implementations described herein and FIG. 4B shows an example reflectivity spectrum of a pump mirror in accordance with certain implementations described herein. As shown in FIG. 4A, the reflectivity of the end mirror 311 can be greater than 99.8% in the region between 515-545 nm, and as shown in FIG. 4B, the reflectivity of the pump mirror 313 can be greater than 99.9% in the region between 495 nm and 575 nm.

The amplifier 307 of certain implementations further comprises several optics such as a thin film polarizer 308, a Pockels cell 309, and a quarter wave plate 310 for achieving regenerative amplification. In the regenerative amplifier, the injected pulse is trapped in the cavity when the voltage of the Pockels cell 309 is on such that the trapped pulse makes round trips and at each round trip the pulse goes through the gain material 312 twice. During the round trips, the seed pulse is amplified by stimulated emission occurring in the gain material. When the applied voltage is turned off, a green amplified pulse 316 can be ejected from the cavity, running in the same optical path as the green seed pulse 305 but in the opposite direction. The green amplified pulse 316 can be separated by an isolator 306 and can be sent to the pulse compressor 317.

Figure 5:
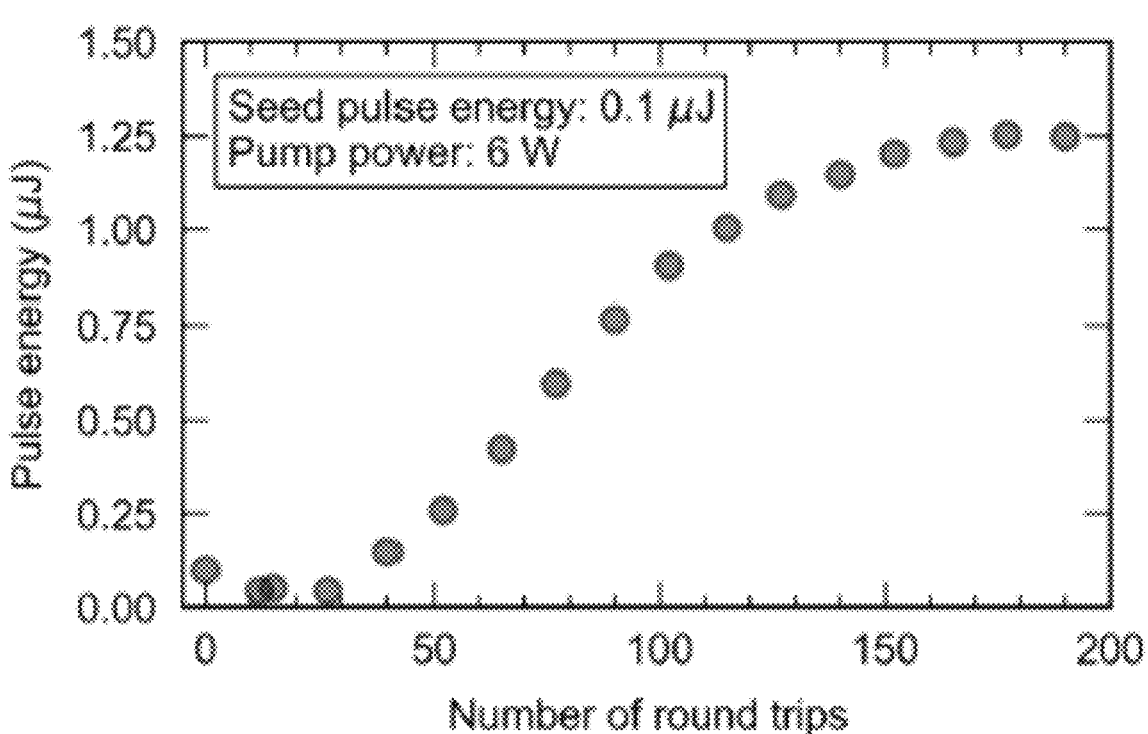
FIG. 5 schematically illustrates an example evolution of the pulse energy for the amplified green laser pulse as a function of the number of round trips in accordance with certain implementations described herein.

FIG. 5 schematically illustrates an example evolution of the pulse energy for the amplified green laser pulse as a function of the number of round trips in accordance with certain implementations described herein. The energy of the injected seed pulse of FIG. 5 is 0.1 µJ. In the early stage, the pulse energy decreases as a result of the loss of partial spectrum that is not resonant to the gain band. However, when the number of round trip reaches about 40, the energy increases rapidly, and when the number of round trips reaches about 190, the energy reaches 1.25 µJ and is saturated there, indicating that the green laser pulse is amplified at least 12.5 times compared to the initial energy.

Figure 6:
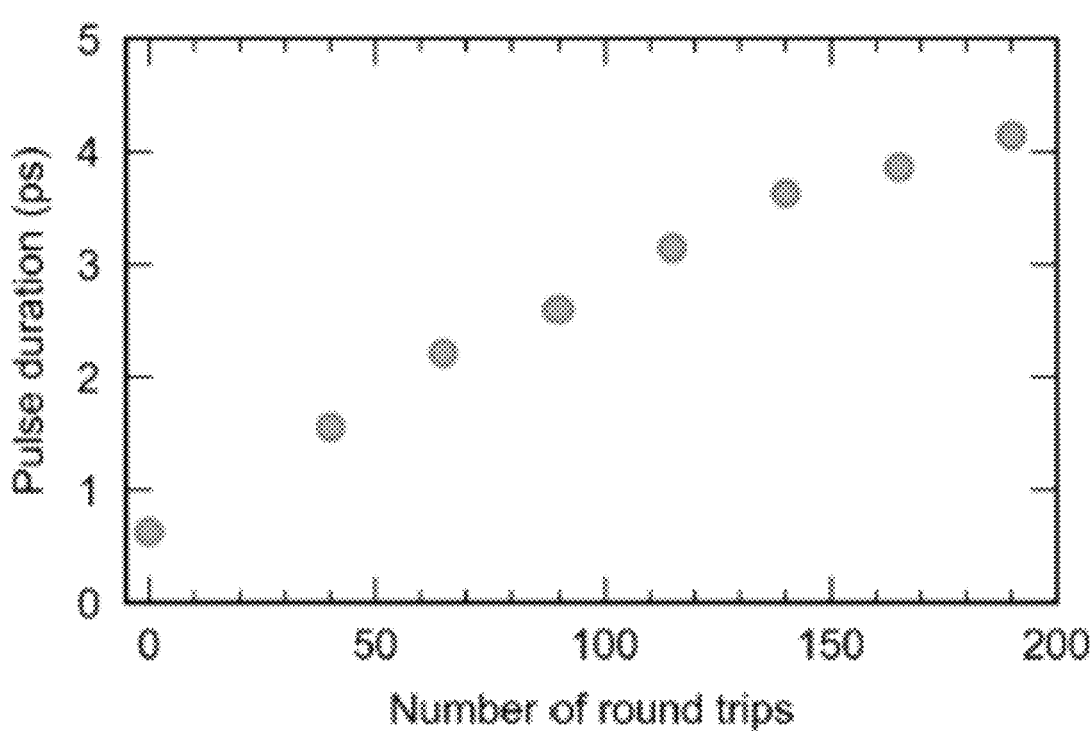
FIG. 6 is a plot of pulse duration for the amplified green laser pulse as a function of the number of round trips in accordance with certain implementations described herein.

FIG. 6 is a plot of pulse duration for the amplified green laser pulse as a function of the number of round trips in accordance with certain implementations described herein. The pulse duration of the seed pulse was 0.63 ps measured in full width at half maximum of the fitted Gaussian. The pulse duration gradually increased during amplification and finally reached more than 4 ps. This elongation could be due to the group dispersion delay given by optics inside cavity.

Figure 7:
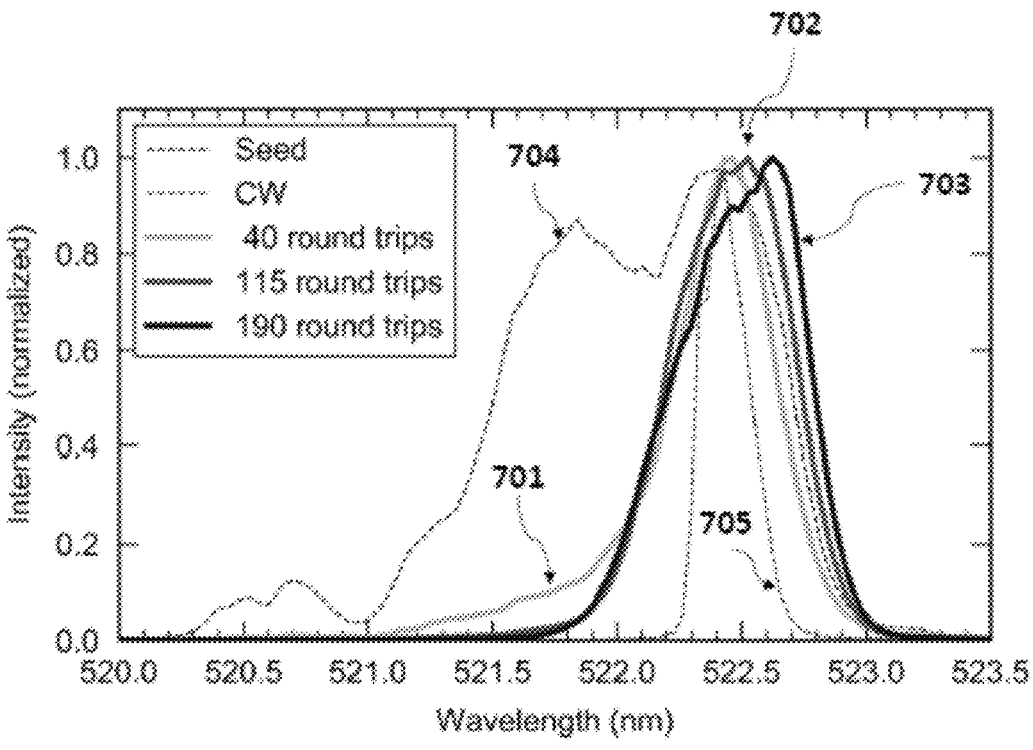
FIG. 7 shows spectra of the amplified green laser pulse for various numbers of round trips in accordance with certain implementations described herein.

FIG. 7 shows spectra of the amplified pulse for various numbers of round trips (701, 702, 703) in accordance with certain implementations described herein, along with the spectra of the seed pulse 704 and a continuous wave (CW) laser oscillation 705 in the praseodymium yttrium lithium fluoride ($Pr^{3+}:LiYF_4$) crystal. The spectrum of the CW laser oscillation was obtained in the same cavity shown in FIG. 3 but when Pockels cell 309 was off and the angle of quarter wave plate 310 was set so that the polarization of light was maintained the same before and after the quarter wave plate 310. Before amplification, the spectrum is equal to that of the seed pulse and has the largest bandwidth. After 40 round trips, the bandwidth shrunk to that of the spectrum 701 and then increased up to about 0.6 nm at 190 round trips (703). It was found that the spectra of the amplified pulse 703 is broader than that of CW 705. This indicates that utilizing a pulse having a bandwidth larger than that of CW results in amplified pulse with the bandwidth larger than CW. During the pulse amplification process, spectral narrowing towards the spectrum of CW can occur (see, e.g., Hara 2020). However, here the spectral broadening was unexpectedly observed even after 40 round trips. The peak wavelength of the amplified pulses was found around 522.5 nm, which almost coincides with that of CW (522.4 nm) 705.

Figure 8:
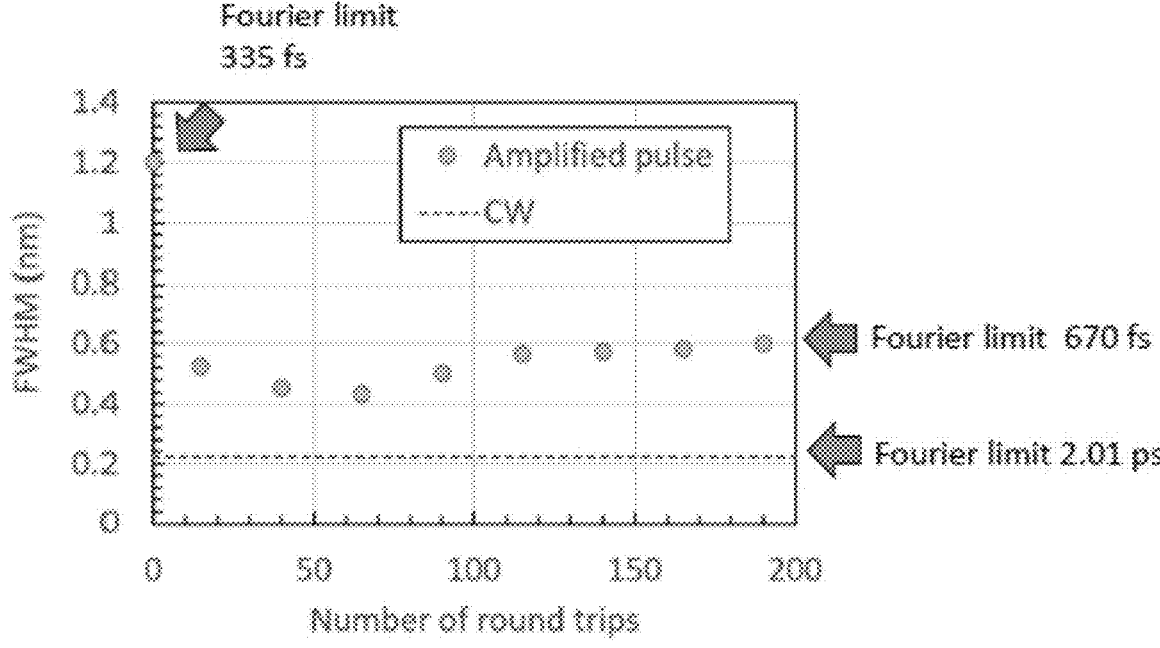
FIG. 8 is a plot of spectral bandwidth for the amplified green laser pulse for various numbers of round trips in accordance with certain implementations described herein.

FIG. 8 is a plot of spectral bandwidth for the amplified green laser pulse during amplification, including that of CW laser, measured in full width at half maximum (FWHM) for various numbers of round trips in accordance with certain implementations described herein. Before amplification, the FWHM bandwidth of the pulse was 1.2 nm and rapidly decreased to about 0.4 nm at the point of 65 round trips. As mentioned herein, from the point of 65 round trips, the bandwidth increased gradually up to 0.6 nm. Again, the bandwidth measured here is three times of that of CW (0.2 nm). The minimum pulse duration calculated for a pulse with the spectrum bandwidth of 0.6 nm and the peak wavelength at 522.6 nm is 670 fs if a Gaussian pulse shape is assumed. Given the spectrum, in theory, the amplified pulse can be compressed to femtosecond region. This is a stark contrast with the pulse duration of 2.01 ps calculated from the peak wavelength (522.4 nm) and bandwidth (0.2 nm) of CW as the Fourier limit.

Figure 9:
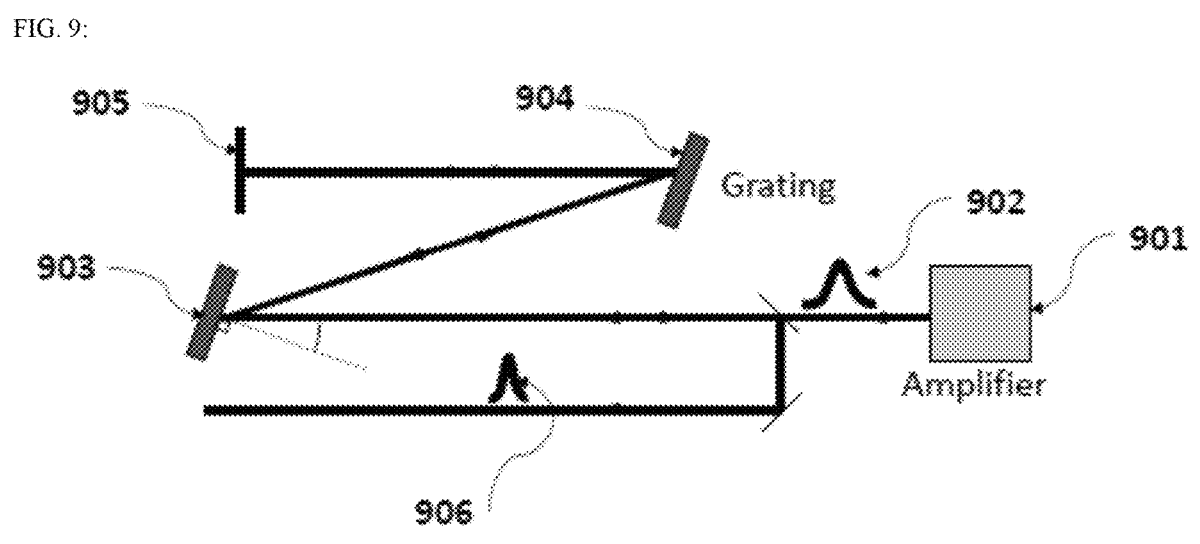

FIG. 9 schematically illustrates pulse compression of the amplified green laser pulse in accordance with certain implementations described herein. Pulse 902 from amplifier 901 is diffracted twice by each diffraction grating (903 and 904). The grating pair gives the pulse a negative group dispersion delay (GDD). By changing a distance between the grating pair, GDD can be controlled to compensate GDD acquired during the amplification.

FIG. 10A shows the autocorrelation function of the amplified green laser pulse before pulse compression in accordance with certain implementations described herein. The pulse duration of the amplified pulse (4.28 ps, assuming Gaussian, at round trip of 190) before the compression was measured by an auto-correlator. FIG. 10B shows the autocorrelation function of the amplified green laser pulse after pulse compression in accordance with certain implementations described herein. The pulse duration of the amplified pulse of FIG. 10B is compressed to 0.94 ps, demonstrating that a pulse duration of the amplified pulse less than 1 ps (e.g., in a femtosecond range) is achieved by certain implementations described herein.

Figure 11:
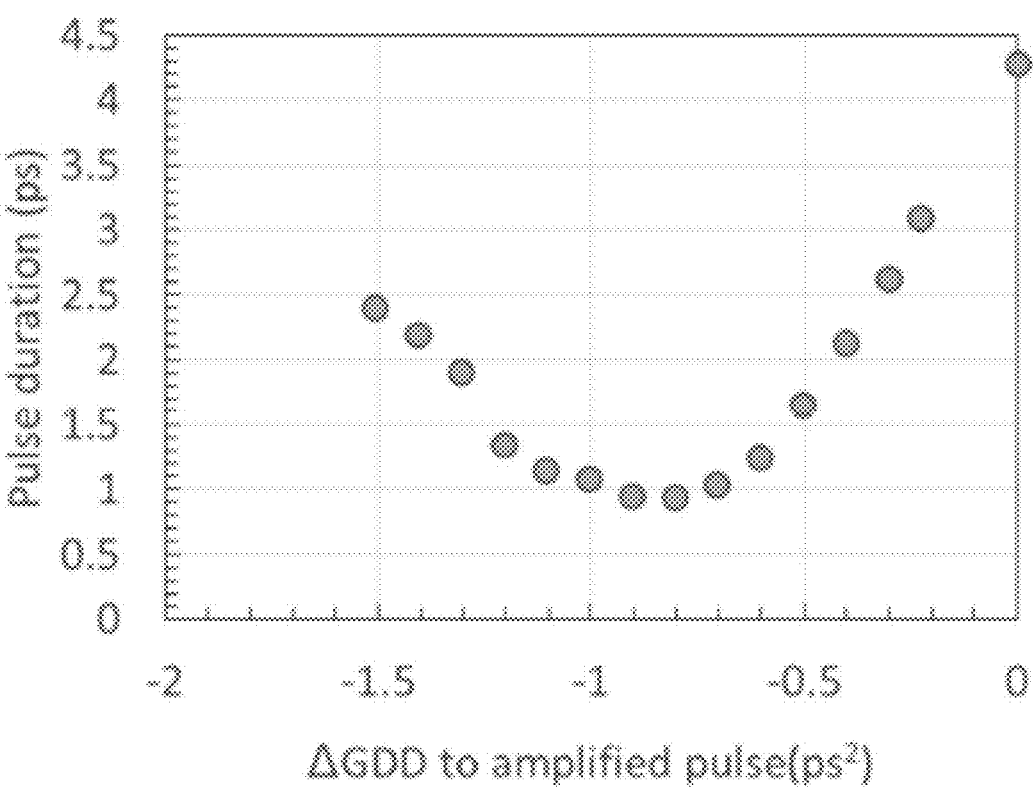
FIG. 11 is a plot of the pulse duration for the amplified green laser pulse as a function of Δ GDD applied to the amplified pulse by the pulse duration controller in accordance with certain implementations described herein.

FIG. 11 is a plot of the pulse duration for the amplified green laser pulse as a function of Δ GDD applied to the amplified pulse by the pulse duration controller (e.g., diffraction grating compressor) in accordance with certain implementations described herein. With the increasing of applied ΔGDD, the pulse duration shows the minimum 0.94 ps at ΔGDD=−0.8 ps², which indicates that pulse duration can be controlled in certain implementations described herein at least in the range from 0.94 ps to 4.28 ps. FIG. 11 also indicates applying a further negative group delay dispersion can elongate the pulse beyond 2.5 ps if a longer pulse duration is to be provided.

Figure 12:
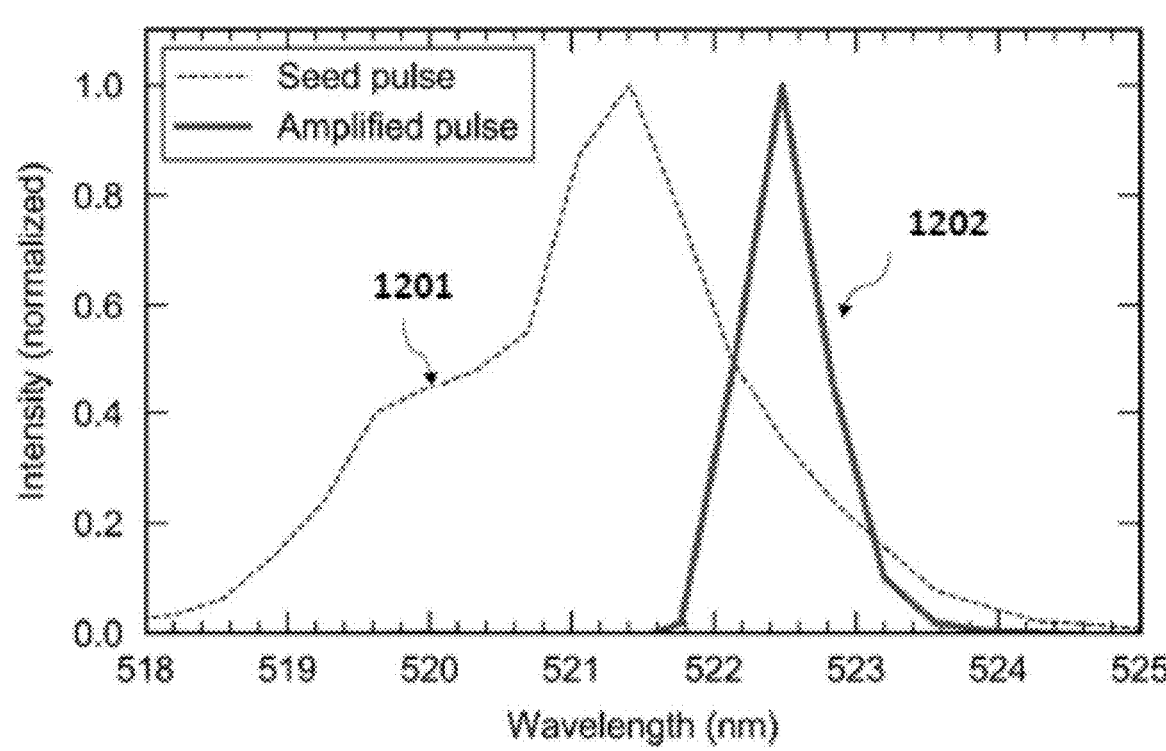
FIG. 12 shows spectra of the seed pulse and the amplified pulse in accordance with certain implementations described herein.

In certain implementations, for example as shown in FIG. 7, the peak wavelengths of seed pulse 704, amplified pulses (701, 702, and 703), and CW 705 almost coincide. To investigate the dependence of the seed pulse amplification on peak wavelength and spectral bandwidth, the peak wavelength of the seed pulse can be shifted (e.g., by about 1.0 nm) to shorter wavelength. FIG. 12 shows the spectra of the seed pulse 1201 and the resultant amplified pulse 1202 in accordance with certain implementations described herein. As can be seen, the seed pulse was successfully amplified. The peak wavelength of the amplified pulse 1202 was located around 522.5 nm, which is almost in accordance with those of the amplified pulses (701, 702, and 703) before the modification of seed pulse spectrum and CW (522.4 nm) 704 in FIG. 7. In addition, the spectral bandwidth of the amplified pulse 1202 of FIG. 12 is as broad as 0.6 nm, which is the same as observed for the amplified pulse (701, 702, and 703) in FIG. 7. Thus, in the disclosed example, the gain band is located in the range between 522.2 nm and 522.8 nm, which is measured from the amplified pulse at 190 round trips 703 in FIG. 7 and the amplified pulse 1202 in FIG. 12. This indicates that, for the amplification to take place, in certain implementations, the spectrum of a seed pulse covers the gain band around the peak wavelength for CW oscillation and the bandwidth should be about 0.6 nm or more.

In certain implementations, the green laser pulse amplifier provides one or more advantages, for example:

An energy of a seed green pulse can be as small as 0.1 μJ or even smaller (see, e.g., FIG. 5).

A seed pulse can be directly amplified at least 10 times in its pulse energy (see, e.g., FIG. 5).

The wavelength of the amplified pulse can be in the range from 520 nm to 540 nm (see, e.g., FIG. 7).

The amplified pulse can have a spectrum bandwidth of 0.6 nm or potentially more in full width at half maximum (see, e.g., FIGS. 7, 8, and 12).

The pulse duration of the amplified pulse can be 5 ps or shorter. With a proper management of group dispersion delay, the pulse duration of the amplified pulse can be 1 ps or shorter (see, e.g., FIG. 10).

In certain implementations, the seed pulse 101 can comprise a green pulse generated by SHG of an ytterbium (Yb) doped fiber pulse laser 301, with the peak wavelength of 522.4 nm and the spectrum width of 1.2 nm in full width at half maximum (see, e.g., FIGS. 7 and 8). For the purpose of spectrum overlap between a seed pulse and the gain band (e.g., 522.2 nm to 522.8 nm) as exemplified in FIGS. 7 and 12, the spectra width of a seed can be narrowed down to 0.6 nm with the coverage of the peak of the gain band. In addition, since both of the peak wavelength and bandwidth of the gain spectra of praseodymium (Pr) are dependent on its host material, the peak wavelength may not be specified to 522.4 nm. Indeed, the peak wavelength of green CW laser in Pr³⁺:LaF₃ crystal is observed around 537.1 nm (see, e.g., Reichert 2012), close to 540 nm. A green seed pulse laser with a peak wavelength around 540 nm can be obtained by SHG of Yb-based pulse laser since the peak wavelength can be in the range between 1030 nm and 1082 nm (see, e.g., Honninger 1998). Thus, the peak wavelength of seed pulse 101 can be chosen accordingly, for example, in the range between 520 nm and 540 nm. In Gün 2011, green emission cross section spectrum for Pr³⁺:LiYF₄ crystal has a peak at about 522 nm and the side shoulder spreads to a longer wavelength region at least to 530 nm. This suggests amplification may still occur around 530 nm if appropriate gain medium and seed pulse wavelength are chosen. Thus, the peak wavelength of seed pulse can be possibly in the range between 520 nm and 530 nm (e.g., between 520 nm and 525 nm). The spectrum bandwidth of seed green pulse 101 can be more than 0.6 nm (e.g., more than 0.9 nm; more than 1.2 nm). In addition, the pulse laser source can be replaced to any optical pulse having a bandwidth more than 0.6 nm in full width at half maximum and covering the gain spectra of a gain material.

Regarding a gain material 106, the praseodymium doped yttrium lithium fluoride ($Pr^{3+}$:$LiYF_4$) crystal used in certain implementations described herein can be replaced with other gain material such as praseodymium (Pr) doped fiber, praseodymium (Pr) doped glass, and praseodymium (Pr) doped ceramics, since the lasing system does not depend on the host materials but on the trivalent praseodymium (Pr).

Regarding an amplified green pulse 104, the power can be amplified as 12.5 times as demonstrated in FIG. 5. If a higher pumping is utilized and a better cooling geometry is applied, efficient amplification can be achieved. In the case, an amplification rate for green pulse 104 can be more than 12.5 times, for example, 20 times or more. As shown in FIG. 7, the peak wavelength of the amplified green pulse at the stage of 190 round trips can be 522.6 nm. As shown in FIG. 8, the spectral bandwidth can be 0.6 nm in full width at half maximum. Since both the peak wavelength and the bandwidth of the gain spectra of praseodymium (Pr) are dependent on its host material, the peak wavelength may not be specified to 522.6 nm, as aforementioned regarding seed pulse. Thus, the peak wavelength of the amplified green pulse 104 can be in the range between 520 nm and 540 nm (e.g., between 520 nm and 530 nm; between 520 nm and 525 nm). In addition, the bandwidth is dependent on the number of round trips (see, e.g., FIG. 8), changing from 0.4 nm to 0.6 nm. Thus, the spectrum bandwidth of the green amplified pulse 104 can be more than 0.4 nm.

In certain implementations, such as shown in FIG. 10, a compressor for amplified pulse (see, e.g., FIG. 9) can be utilized to change the amplified pulse duration from 4.28 ps to 0.94 ps. Regarding the upper limit of controllable range of pulse duration, pulse duration can be further stretched, since the range of the pulse duration control was limited by the experimental setup in the example, pulse duration can be further elongated to be, for example, 30 ps, with a proper modification of the compressor. For the lower limit, as shown in FIG. 6, the pulse duration can be nearly linearly dependent on the number of round trips. For the 0 number of the round trip (e.g., before pulse enters the cavity), the pulse duration can be 0.63 ps. If the amplification rate becomes higher than in the example implementation, the number of round trips can be reduced to several round trips and the lower limit of the pulse duration can be close to 0.63 ps. Thus, the pulse duration of the amplified green pulse 104 can be in the range between 0.6 ps to 30 ps (e.g., for micro-machining application, in the range between 0.94 ps and 10 ps; in the range between 0.94 ps and 5 ps).

In certain implementations, the regenerative amplification scheme (see, e.g., FIG. 3) can be replaced with a single pass or multipass amplification scheme where each pass of the pulse in crystal is spatially different. This is because a seed pulse has only to go through the gain material for amplifications.

Figure 13:
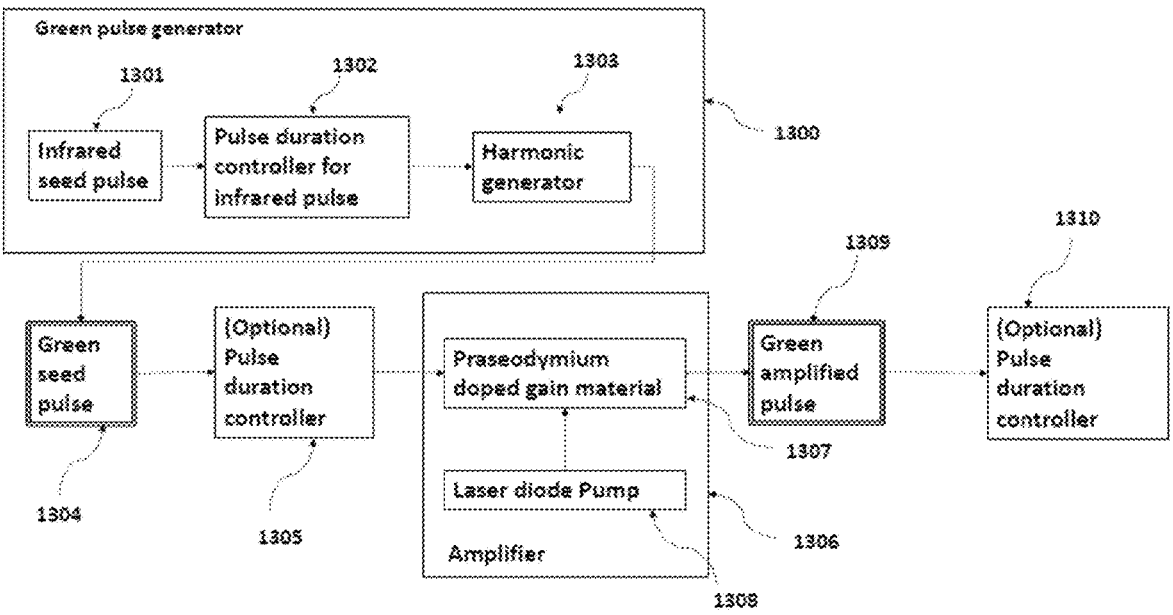
FIG. 13 schematically illustrates another example laser green pulse amplifier in accordance with certain implementations described herein.

FIG. 13 schematically illustrates another example laser green pulse amplifier in accordance with certain implementations described herein. The green pulse generator 1300 of FIG. 13 is different from the green pulse generator 100 of FIG. 1. In certain implementations, a near infrared seed pulse 1301 is sent to the pulse duration controller for near infrared pulse 1302 and converted to second or third harmonic pulse by harmonic generator 1303. A green seed pulse 1304 from green pulse generator 1300 is sent to the pulse duration controller 1305, which is optional, and amplified by amplifier 1306, and green amplified pulse 1309 is optionally sent to pulse duration controller 1310.

In certain implementations, a source of infrared seed pulse 1301 can be an ytterbium (Yb) doped silica fiber pulse laser or erbium doped fiber pulse laser, and pulse duration controller for infrared pulse 1302 can be pulse compressor or stretcher comprising an optical fiber, diffraction grating pair, a prism pair, a grism pair (a combination of a prism and a diffraction grating), a chirped dielectric mirror, a volume Bragg grating, a fiber Bragg grating, and a hollow-core fiber.

In certain implementations, a harmonic generator 1303 can be second harmonic generator for infrared pulse around 1-1.1 μm near infrared pulse or third harmonic generator for around 1.5-1.6 μm. A nonlinear crystal used in harmonic generator 1303 can be such as beta barium borate crystal or lithium triborate ($LiB_3O_5$) crystal.

Figure 14:
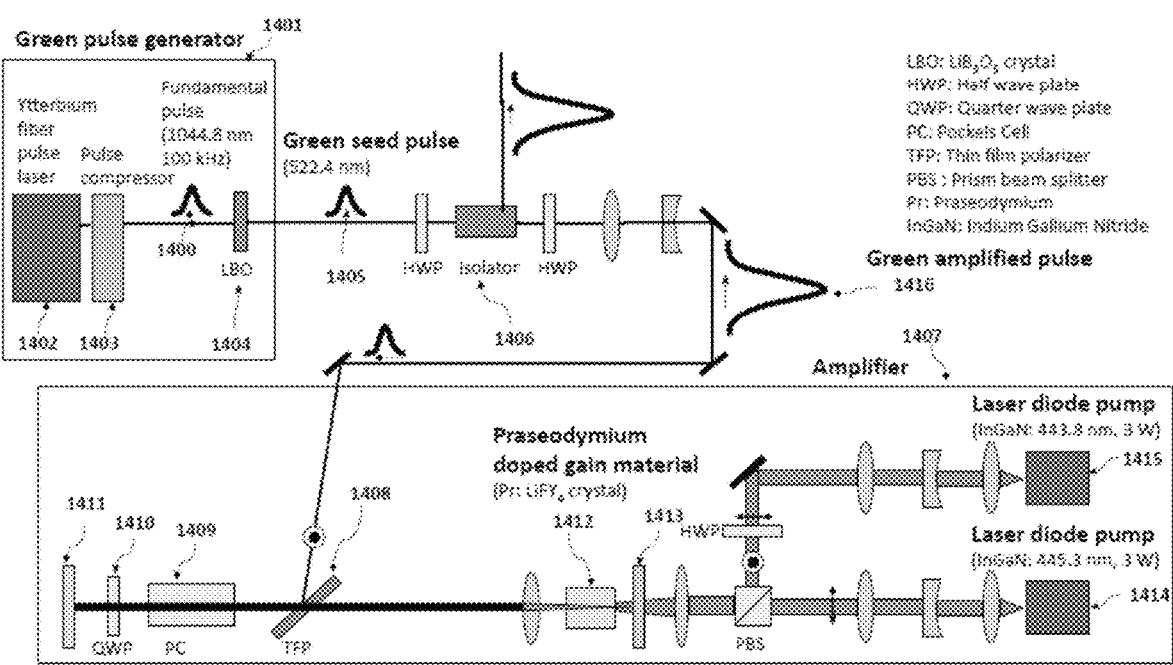
FIG. 14 schematically illustrates an example green laser pulse amplification system in accordance with certain implementations described herein.

FIG. 14 schematically illustrates an example green laser pulse amplification system in accordance with certain implementations described herein. The setup of FIG. 14 is almost the same as in FIG. 3, except that the pulse compressor 303 was adjustable, and pulse compressor 317 was not utilized.

Figure 15:
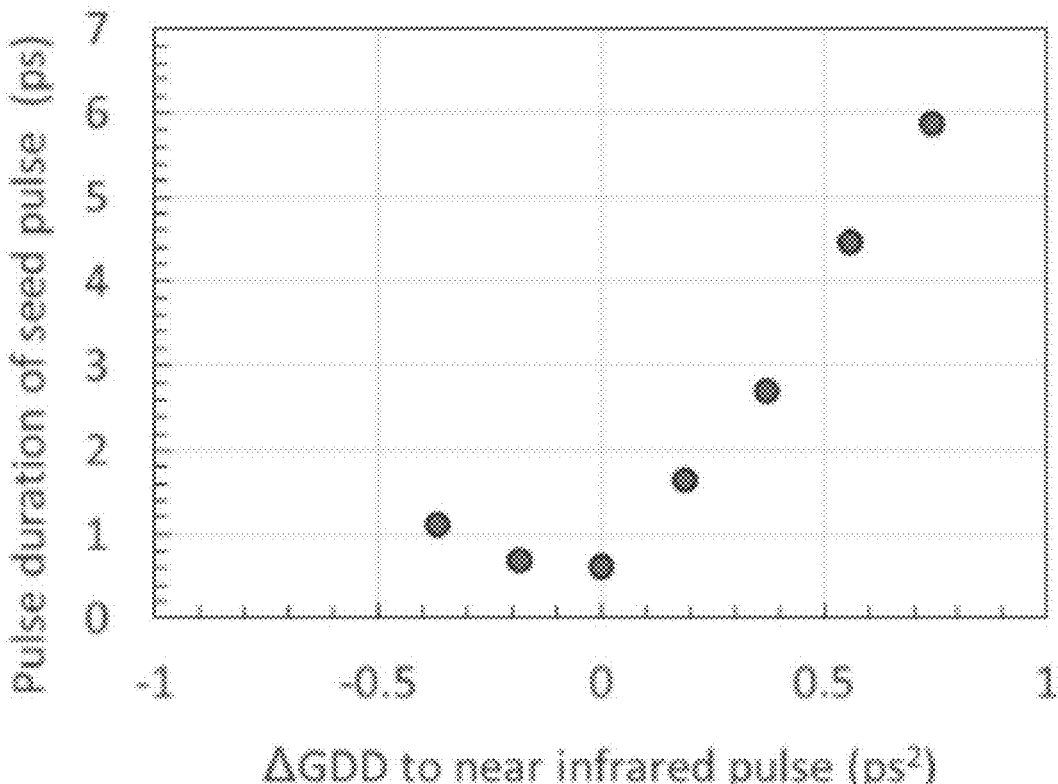
FIG. 15 is a plot of the pulse duration of the green seed pulse as a function of ΔGDD applied to the near infrared laser pulse in accordance with certain implementations described herein.

A pulse compressor comprising a diffraction grating can be used to compensate the quantity of a down chirp added to a pulse, by changing the optical pass between diffraction gratings. In certain implementations, the compressor for infrared pulse can be fixed so that the green seed pulse have a minimum pulse duration of 0.63 ps. In certain other implementations, the optical length in the pulse compressor 1403 can be controlled before the harmonic generator, e.g., lithium triborate ($LiB_3O_2$) 1404 in FIG. 14, which can provide an additional group delay dispersion to near infrared fundamental pulse 1400. In FIG. 14, an additional group delay dispersion (ΔGDD) is applied to the near infrared pulse 1400. Before applying additional ΔGDD, SHG pulse has a duration of about 0.63 ps. FIG. 15 is a plot of the pulse duration of the green seed pulse as a function of ΔGDD applied to the near infrared laser pulse in accordance with certain implementations described herein. The pulse duration of the green seed pulse has a minimum of 0.63 ps at 0 $ps^2$, reaching 6 ps at 0.74 $ps^2$ and about 1.2 ps at −0.37 $ps^2$.

Figure 16:
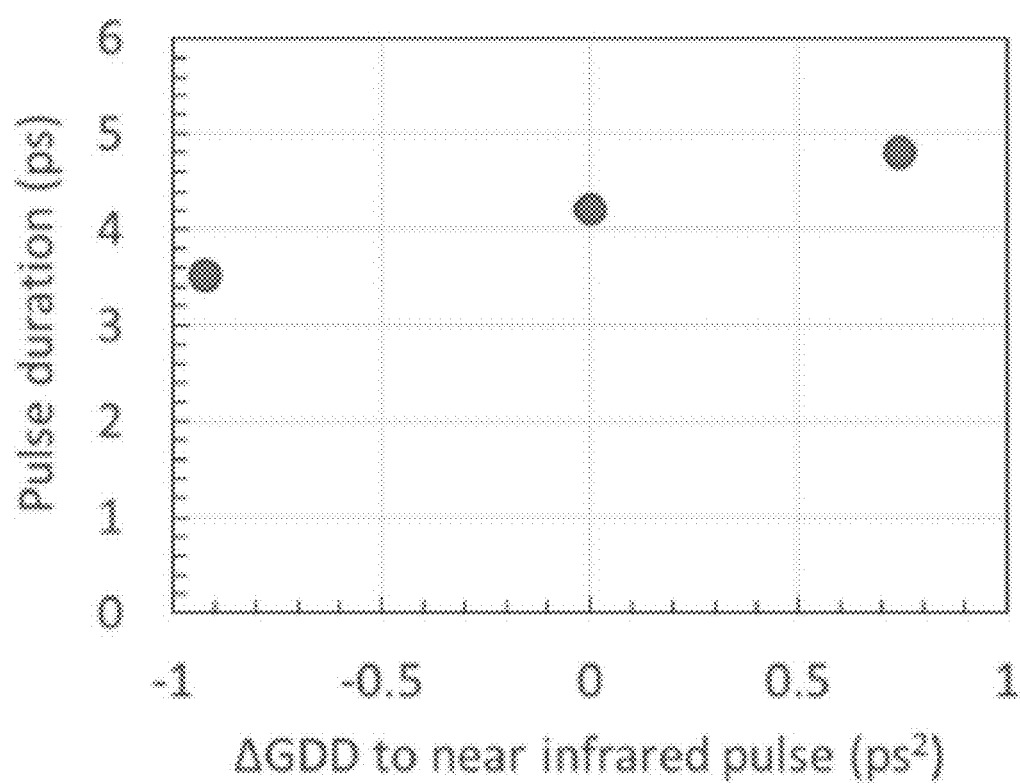
FIG. 16 is a plot of the pulse duration for the amplified green laser pulse as a function of ΔGDD applied to near infrared laser pulse in accordance with certain implementations described herein.

FIG. 16 is a plot of the pulse duration for the amplified green laser pulse for seed pulses with ΔGDD=−0.925 $ps^2$, ΔGDD=0 $ps^2$, and ΔGDD=0.74 $ps^2$ added as a function of ΔGDD applied to near infrared laser pulse in accordance with certain implementations described herein. For ΔGDD=0, the pulse duration of the amplified pulse was 4.2 ps. The elongation from 0.63 ps to 4.2 ps is due to the up-chirping effect during amplification. As shown in FIG. 16, a seed pulse with ΔGDD=−0.925 $ps^2$ results in the pulse duration of the amplified pulse to 3.5 ps. A reduction from 4.2 ps to 3.5 ps is due to the fact that original down-chirping applied to near infrared pulse helps to mitigate the up-chirping effect during amplification. On the other hand, a seed pulse with ΔGDD=0.74 $ps^2$ results in a larger pulse duration of the green amplified pulse up to 4.8 ps. The increase from 4.2 ps to 4.8 ps is due to the additional up-chirping effect coming from near infrared pulse. Therefore, by controlling chirping condition of infrared seed pulse 1301 with an adjustment of applied group delay dispersion, in certain implementations, the pulse duration of amplified pulse can be controlled.

In the example shown in FIG. 14, the pulse duration of the amplified pulse is carried out through the control of ΔGDD of the infrared fundamental pulse 1400 by the compressor 1403 before the lithium triborate ($LiB_3O_5$) crystal 1404. In FIG. 14, if the pulse duration controller for the infrared pulse 1302 can provide a sufficient ΔGDD for obtaining a designated amplified green pulse 1309, either or both of optional pulse duration controllers 1305 and 1310 can be omitted, and the total system of certain implementations can be simple, compact and cost effective. In addition, a combination of pulse duration controller for infrared pulse 1302 and pulse duration controller for green amplified pulse 1310 can be used as a chirped pulse amplifier system (see, e.g., Backus 1997; Liu 2001) for efficient amplification avoiding the damage of the gain material 1307. However, this does not eliminate a possibility of simultaneous usage of the pulse duration controller for the infrared pulse 1302 and the pulse duration controller for the green pulse 1305.

An amplifier can be based on Pr-doped fiber as a gain material as described herein. For infrared pulse amplification (see, e.g., L. Shah, et al., "High-Power Ultrashort-Pulse Fiber Amplifiers", IEEE Journal of Selected Topics in Quantum Electronics, Vol. 22, No. 3, pp 552-558, (2007)), Yb-doped silica fiber was used to amplify infrared ultrashort pulses, having a center wavelength around 1060 nm, and 50-$\mu$J-subpicosecond pulses at 1 MHz repetition rate can be achieved. In U.S. Pat. No. 9,570,880, amplification of infrared ultrashort pulses with maintaining single-mode propagation is demonstrated in the multi-mode fiber. In U.S. Pat. Appl. Publ. No. 2005/0105865, a detailed method to obtain an amplified infrared ultrashort pulse using chirp pulse amplification in all fiber system is described.

Figure 17:
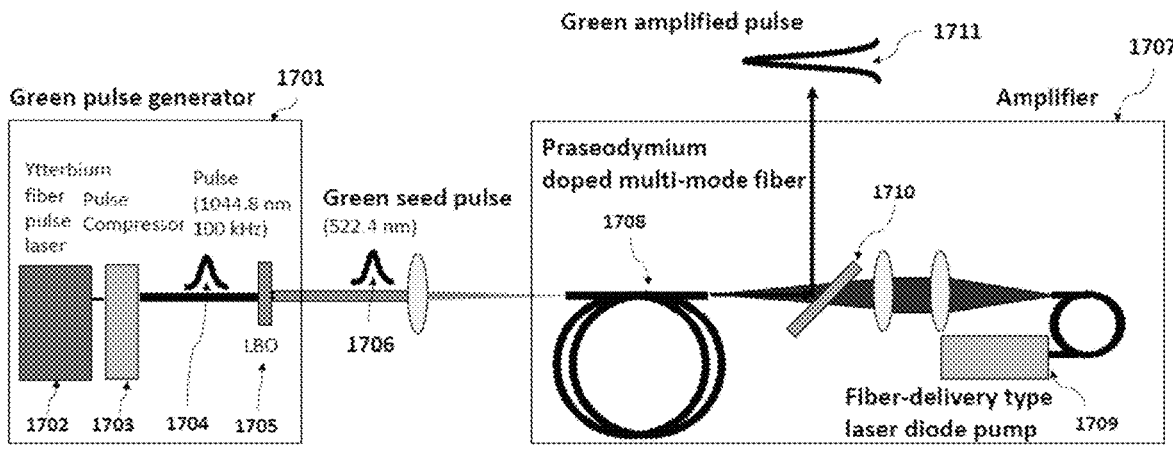
FIG. 17 schematically illustrates an example laser amplifier for green laser pulses in accordance with certain implementations described herein.

FIG. 17 schematically illustrates an example green laser pulse amplification system in accordance with certain implementations described herein. The amplifier is based on Pr-doped multi-mode fiber 1708 as a gain material. The green pulse generator 1701 is the same as the green pulse generator 1401 in FIG. 14. The green seed pulse 1706 is sent to the amplifier 1707. The amplifier 1707 comprises a Pr-doped multi-mode fiber 1708 as a gain material, a fiber-delivery type laser diode pump 1709, and a dichroic mirror 1710. The multi-mode fiber 1708 is excited from one port of the fiber by the fiber-coupled laser diode pump 1709. The fiber-delivery type laser diode pump 1709, based on gallium nitride semiconductor, operates at continuous wave mode and its wavelength is in the range between 435 nm and 450 nm. The pump light goes through a dichroic mirror 1710 and into the multi-mode fiber 1708 in the cladding pump scheme. The dichroic mirror 1710 transmits blue light at least in the range between 435 nm and 450 nm but reflects green light at least in the range between 520 nm and 540 nm. A green seed pulse 1706 is coupled into the multi-mode fiber 1708 from the other port of the fiber and is amplified during propagation inside the fiber 1708. Thus, an amplified green pulse 1711 comes out from the multi-mode fiber 1708, and is further reflected by the dichroic mirror 1710, separated from the pump light.

The multi-mode fiber 1708 of certain implementations comprises ZBLAN glass fiber or fluoroaluminate based glass fiber. CW laser oscillation in single-mode fibers can be achieved in Pr-doped ZBLAN glass fiber at a wavelength of 521 nm and 10 dB bandwidth of 2.0 nm (see e.g., Okamoto 2012) and CW laser oscillation in single-mode fibers can be achieved in Pr-doped fluoroaluminate based fiber at a wavelength of 522.2 nm and FWHM bandwidth of 1.2 nm (see e.g., Nakanishi 2011). In certain implementations, the multi-mode fiber 1708 can be a double clad fiber for enhancing coupling efficiency of pump light into the fiber. The doping concentration of Pr in core can be in the range of 1500 ppm mol to 10000 ppm mol (e.g., doping concentration of Pr in the range of 1500 ppm to 5000 ppm mol). The core diameter can be in the range between 15 $\mu$m and 30 $\mu$m. The diameter of the inner clad can be in the range between 200 $\mu$m and 300

$\mu$m. The inner clad shape can be a circle shape, a D shape, an octagon shape and the position of the core may be decentered, so as to increase the absorption of pump light by the dopant in the core. The stress-applying-structures such as stress rods can be incorporated into the clad to achieve a polarization maintaining fiber and to maintain the polarization of the green seed pulse 1706 during an amplification inside the Pr-doped multi-mode fiber 1708. The length of the multi-mode fiber 1708 can be in the range between 10 cm and 1000 cm.

The pumping source 1709 can be a fiber-delivery type laser diode pump or emission from a laser diode or a laser diode bar can be delivered via free space optics to couple into the Pr-doped multi-mode fiber 1708.

The pulse duration of the seed pulse 1706 can be controlled by an optional pulse duration controller 1703, as schematically illustrated in FIG. 17 and as demonstrated in FIG. 15. Furthermore, the pulse duration of the green seed pulse can be directly controlled by a pulse duration controller 1305. Also, the amplified pulse can be compressed by a pulse duration controller 1310, aiming for a proper amplification and resultant pulse duration, which is a chirped pulse amplification (see, e.g., Backus 1997; Liu 2001). The detail technique using fibers as pulse duration controllers is described in U.S. Pat. Appl. Publ. No. 2005/0105865.

Example, non-limiting experimental data are included herein to illustrate results achievable by various implementations of the systems and methods described herein. All ranges of data and all values within such ranges of data that are shown in the figures or described in the specification are expressly included in this disclosure. The example experiments, experimental data, tables, graphs, plots, figures, and processing and/or operating parameters (e.g., values and/or ranges) described herein are intended to be illustrative of operating conditions of the disclosed systems and methods and are not intended to limit the scope of the operating conditions for various implementations of the methods and systems disclosed herein. Additionally, the experiments, experimental data, calculated data, tables, graphs, plots, figures, and other data disclosed herein demonstrate various regimes in which implementations of the disclosed systems and methods may operate effectively to produce one or more desired results. Such operating regimes and desired results are not limited solely to specific values of operating parameters, conditions, or results shown, for example, in a table, graph, plot, or figure, but also include suitable ranges including or spanning these specific values. Accordingly, the values disclosed herein include the range of values between any of the values listed or shown in the tables, graphs, plots, figures, etc. Additionally, the values disclosed herein include the range of values above or below any of the values listed or shown in the tables, graphs, plots, figures, etc. as might be demonstrated by other values listed or shown in the tables, graphs, plots, figures, etc. Also, although the data disclosed herein may establish one or more effective operating ranges and/or one or more desired results for certain implementations, it is to be understood that not every implementation need be operable in each such operating range or need produce each such desired result. Further, other implementations of the disclosed systems and methods may operate in other operating regimes and/or produce other results than shown and described with reference to the example experiments, experimental data, tables, graphs, plots, figures, and other data herein.

The invention has been described in several non-limiting implementations. It is to be understood that the implementations are not mutually exclusive, and elements described in connection with one implementation may be combined with, rearranged, or eliminated from, other implementations in suitable ways to accomplish desired design objectives. No single feature or group of features is necessary or required for each implementation.

For purposes of summarizing the present invention, certain aspects, advantages and novel features of the present invention are described herein. It is to be understood, however, that not necessarily all such advantages may be achieved in accordance with any particular implementation. Thus, the present invention may be embodied or carried out in a manner that achieves one or more advantages without necessarily achieving other advantages as may be taught or suggested herein.

As used herein any reference to "one implementation" or "some implementations" or "an implementation" means that a particular element, feature, structure, or characteristic described in connection with the implementation is included in at least one implementation. The appearances of the phrase "in one implementation" in various places in the specification are not necessarily all referring to the same implementation. Conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. In addition, the articles "a" or "an" or "the" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y, and at least one of Z to each be present.

Thus, while only certain implementations have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the implementations described therein.

What is claimed is:

1. A laser amplifier system for a green laser pulse, the laser amplifier system comprising:

at least one gain medium doped with praseodymium and at least one gallium nitride based diode laser for pumping the gain medium, whereby a green seed laser pulse going through the gain medium becomes an amplified green laser pulse, wherein the amplified green laser pulse has a pulse duration within the range between 0.6 picosecond and 30 picoseconds in full width at half maximum.

2. The laser amplifier system of claim 1, wherein the gallium nitride based diode laser has a peak wavelength within the range between 435 nm and 450 nm.

3. The laser amplifier system of claim 1, wherein the green seed laser pulse has a peak wavelength within the range between 520 nm and 540 nm.

4. The laser amplifier system of claim 1, wherein the green seed laser pulse has a spectrum bandwidth more than 0.6 nm in full width at half maximum.

5. The laser amplifier system of claim 1, wherein the energy of the amplified green pulse is at least more than ten times of that of said green laser pulse.

6. The laser amplifier system of claim 1, wherein the amplified green laser pulse has a peak wavelength between 520 nm and 540 nm.

7. The laser amplifier system of claim 1, wherein the amplified green laser pulse has a spectrum bandwidth of more than 0.4 nm in full width at half maximum.

8. The laser amplifier system of claim 1, further comprising a pulse duration controller configured to modify a pulse duration of the green seed laser pulse.

9. The laser amplifier system of claim 1, further comprising a pulse duration controller configured to modify the pulse duration of the amplified green laser pulse.

10. A method of laser pulse amplification, the method comprising:

providing a green laser pulse;

providing at least one gain material doped with praseodymium;

pumping the gain material by at least one gallium nitride based diode laser; and having the green laser pulse go through the gain material, such that the green laser pulse becomes an amplified green laser pulse, wherein the amplified green laser pulse has a pulse duration within the range between 0.6 picosecond and 30 picoseconds in full width at half maximum.

11. The method of claim 10, wherein the gallium nitride based diode laser has a peak wavelength within the range between 435 nm and 450 nm.

12. The method of claim 10, wherein the green laser pulse has a peak wavelength within the range between 520 nm and 540 nm.

13. The method of claim 10, wherein the green laser pulse has a spectrum bandwidth more than 0.6 nm in full width at half maximum.

14. The method of claim 10, wherein the energy of the amplified green laser pulse is at least more than ten times of that of said green laser pulse.

15. The method of claim 10, wherein the amplified green laser pulse has a peak wavelength between 520 nm and 540 nm.

16. The method of claim 10, wherein the amplified green laser pulse has a spectrum bandwidth of more than 0.4 nm in full width at half maximum.

17. The method of claim 10, further comprising modifying a pulse duration of the green laser pulse.

18. The method of claim 10, further comprising modifying the pulse duration of the amplified green laser pulse.

\* \* \* \* \*